(12) United States Patent
Liu et al.

(10) Patent No.: US 12,379,651 B2
(45) Date of Patent: Aug. 5, 2025

(54) PROJECTION LENS MODULE (71) Applicant: Coretronic Corporation, Hsin-Chu (TW)

(72) Inventors: Ming-Chen Liu, Hsin-Chu (TW); Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 446 days.

(21) Appl. No.: 18/078,999

(22) Filed: Dec. 11, 2022

(65) Prior Publication Data

US 2023/0194964 A1  Jun. 22, 2023

(30) Foreign Application Priority Data

Dec. 22, 2021  (CN) .......................... 202111576568.4

(51) Int. Cl.
| | | |
|---|---|---|
| *G03B 21/16* | (2006.01) | |
| *G02B 7/02* | (2021.01) | |
| *G02B 17/00* | (2006.01) | |
| *G03B 21/14* | (2006.01) | |
| *H04N 9/31* | (2006.01) | |

(52) U.S. Cl.
CPC ........... *G03B 21/142* (2013.01); *G02B 7/022* (2013.01); *G02B 7/025* (2013.01); *G02B 17/002* (2013.01); *G03B 21/145* (2013.01)

(58) Field of Classification Search
CPC ...... G03B 21/145; G03B 21/28; G03B 21/16; H04N 9/3144; G02B 13/16
See application file for complete search history.

(56) References Cited

U.S. PATENT DOCUMENTS 6,450,646 B1 * 9/2002 Ono ...................... G03B 21/10
353/74
2010/0079732 A1  4/2010 Lo et al.

FOREIGN PATENT DOCUMENTS

| | | |
|---|---|---|
| CN | 101000457 | 7/2007 |
| CN | 204178110 | 2/2015 |
| CN | 105159015 | 12/2015 |
| CN | 105911802 | 8/2016 |
| CN | 112505995 | 3/2021 |
| CN | 112987464 | 6/2021 |
| CN | 214846196 | 11/2021 |
| JP | 2005234275 | 9/2005 |

OTHER PUBLICATIONS

"Office Action of China Counterpart Application", issued on Apr. 2, 2025, p. 1-p. 8.

* cited by examiner

Primary Examiner — Ryan D Howard
(74) Attorney, Agent, or Firm — JCIPRNET (57) ABSTRACT A projection lens module includes a lens assembly, a reflector arranged beside the lens assembly, a housing assembly covering the reflector, and a buffer. The reflector includes a reflecting surface and a back surface opposite to each other; the reflecting surface faces the lens assembly to reflect a light beam passing through the lens assembly. The housing assembly includes a flow channel frame, an inner surface. The flow channel frame is arranged on the inner surface and protrudes toward the back surface. The buffer is sandwiched between the flow channel frame and the back surface. A flow channel is formed between the flow channel frame and the back surface and communicates with the air inlet and the air outlet.

11 Claims, 6 Drawing Sheets

PROJECTION LENS MODULE

CROSS-REFERENCE TO RELATED APPLICATION

This application claims the priority benefit of China application serial no. 202111576568.4, filed on Dec. 22, 2021. The entirety of the above-mentioned patent application is hereby incorporated by reference herein and made a part of this specification.

BACKGROUND OF THE INVENTION

1. Field of the Invention

The invention relates to a lens module and particularly relates to a projection lens module.

2. Description of Related Art

Current optical projection devices, such as single beam projectors, are able to project high-quality images, wherein projection lens assemblies of the optical projection devices are important components that affect the image quality of the optical projection devices.

Light beams of the optical projection devices are emitted through the projection lens assemblies and projected onto projection screens. During the projection process, the light beams having high energy lead to an increase in the temperature of components of the projection lenses (e.g., reflectors, convex lenses, concave lenses, and so on), thus posing a negative impact on the image quality of the optical projection devices. Therefore, how to prevent overheating phenomenon from affecting the image quality is an imminent problem to be solved in the pertinent art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a projection lens module with favorable heat dissipation performance.

Other objectives and advantages of the invention may be further understood from the technical features disclosed in the invention.

In order to achieve one, some, or all of the aforementioned objectives or other objectives, an embodiment of the invention provides a projection lens module that includes a lens assembly, a reflector, a housing assembly, and a buffer. The reflector is arranged beside the lens assembly and includes a reflecting surface and a back surface opposite to each other, where the reflecting surface faces the lens assembly to reflect a light beam passing through the lens assembly. The housing assembly covers the reflector and includes a flow channel frame, an inner surface, and an air inlet and an air outlet facing the back surface. The flow channel frame is arranged on the inner surface of the housing assembly and protrudes toward the back surface. The buffer is sandwiched between the flow channel frame and the back surface. A flow channel is formed between the flow channel frame and the back surface of the reflector and communicates with the air inlet and the air outlet.

In view of the above, the housing assembly of the projection lens module provided in one or more embodiments of the invention includes the air inlet and the air outlet facing the back surface of the reflector, and the flow channel frame is arranged on the inner surface of the housing assembly and protrudes toward the back surface, so that the flow channel is formed between the flow channel frame and the back surface of the reflector and communicates with the air inlet and the air outlet. Hence, an air flow may enter the flow channel from the air inlet, flow beside the back surface of the reflector, and leaves from the air outlet to take away heat energy of the reflector for effective temperature reduction. Besides, the flow channel frame allows the air flow to be concentrated to a heat generating region of the reflector, which may enhance heat dissipation efficiency. Additionally, the buffer is sandwiched between the flow channel frame and the back surface of the reflector, so that other space in the housing assembly is enclosed and thus isolated from the flow channel. Thereby, dust mixed into the air flow entering the flow channel may be prevented from affecting reflection effects of the reflector, and quality of an image frame may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to".

Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
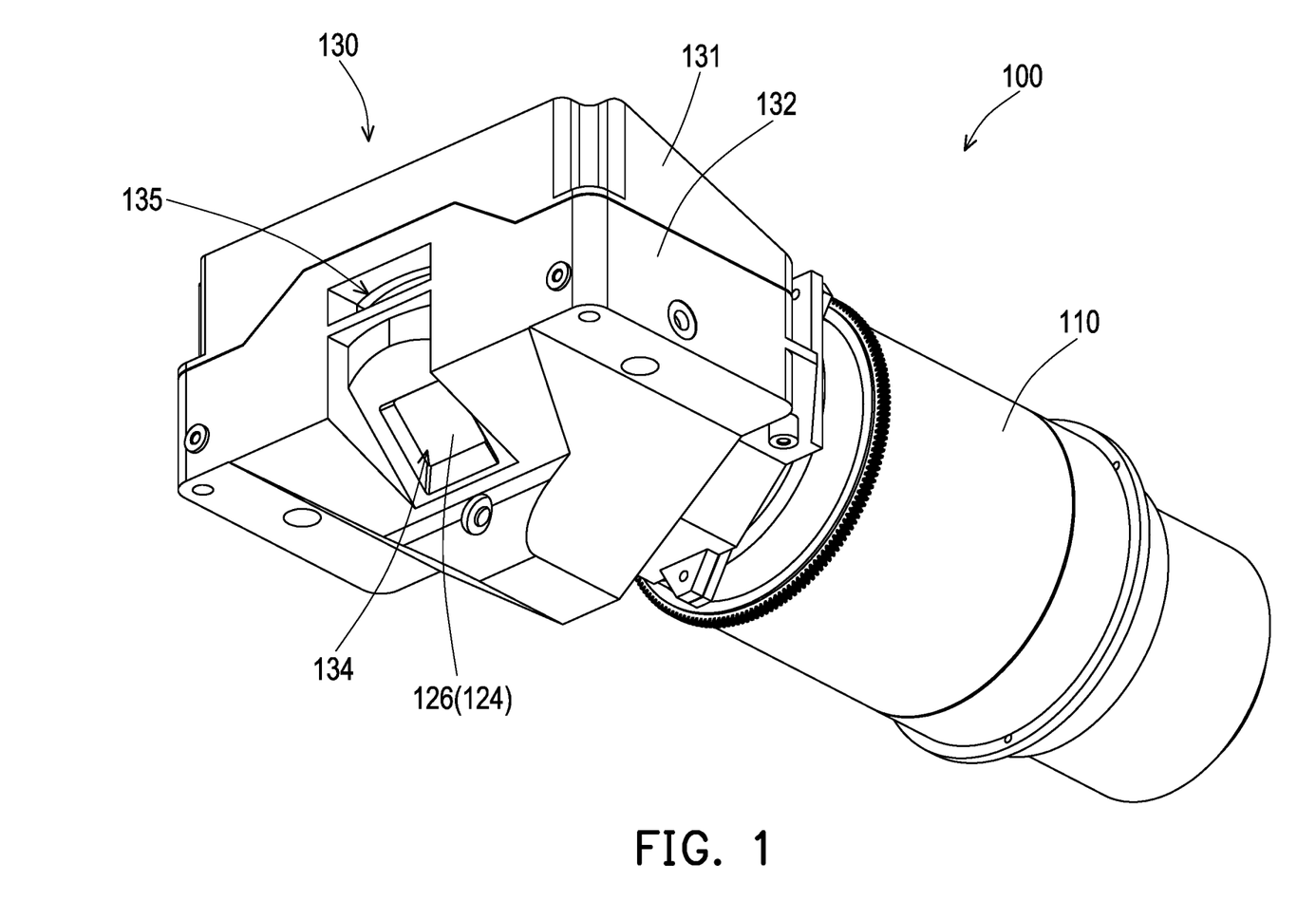
FIG. 1 is a schematic view illustrating a projection lens module according to an embodiment of the invention.
Figure 2:
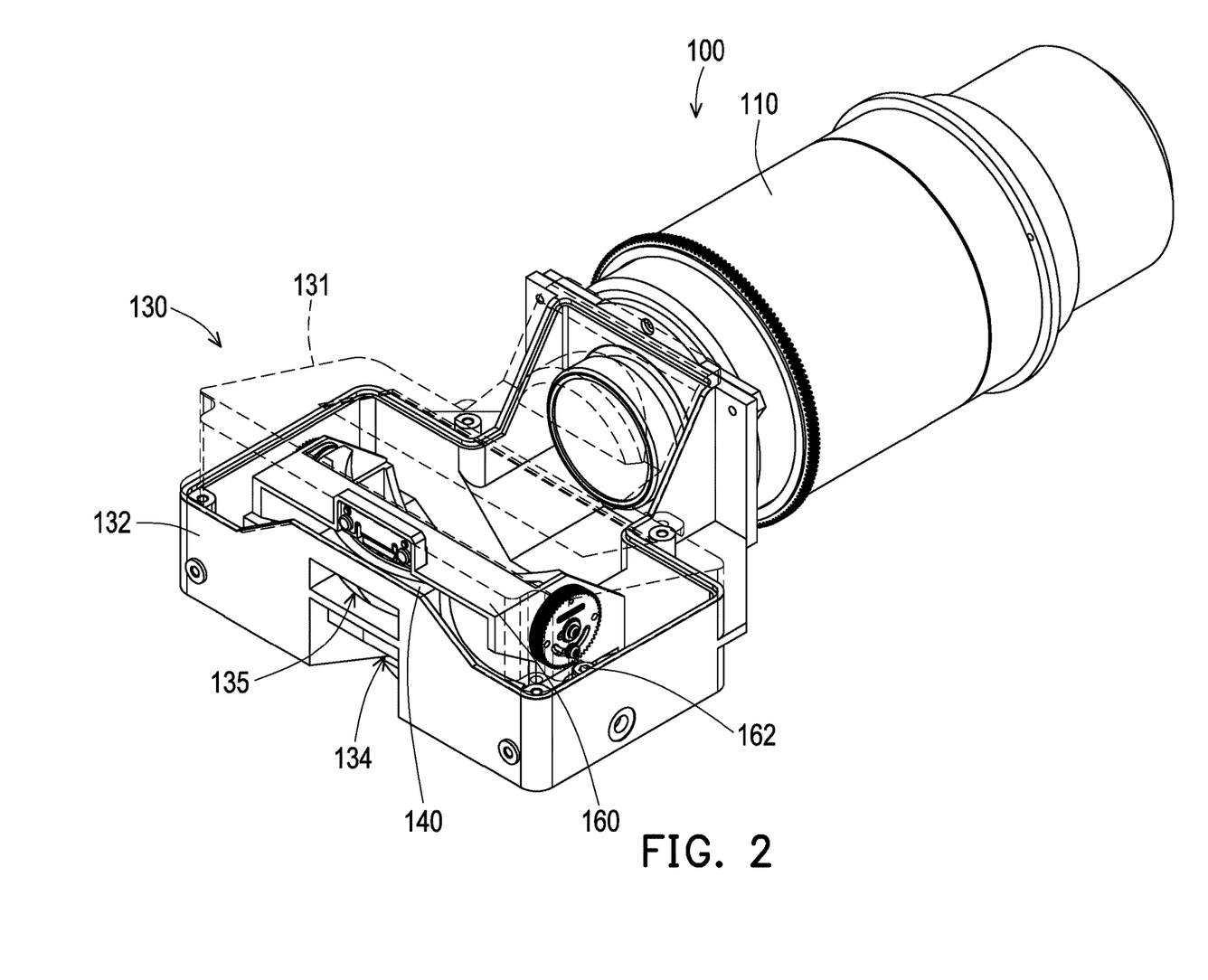
FIG. 2 is a schematic perspective view illustrating an upper housing in the projection lens module depicted in FIG. 1.
Figure 3:
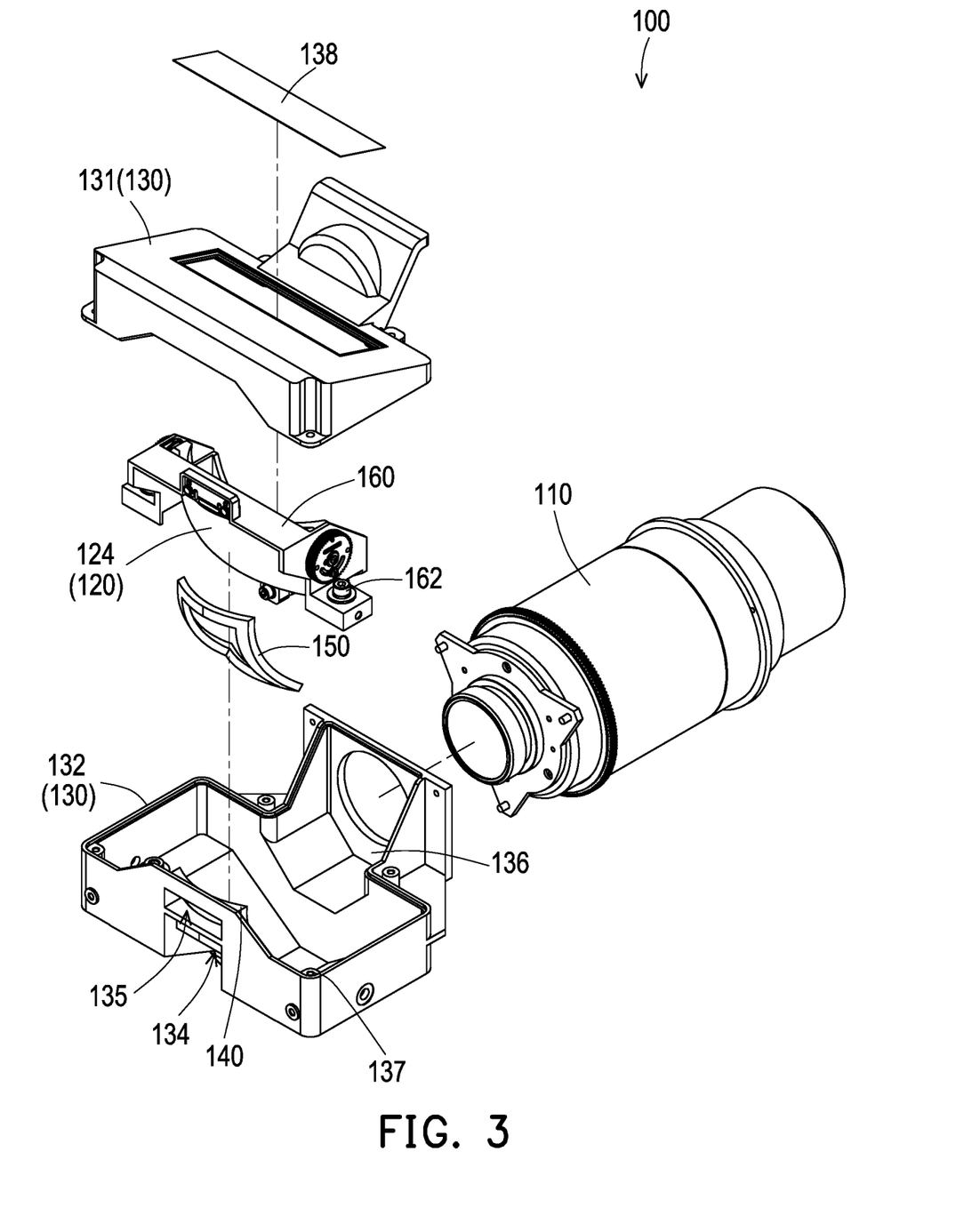
FIG. 3 is a schematic exploded view illustrating the projection lens module depicted in FIG. 1.
Figure 4:
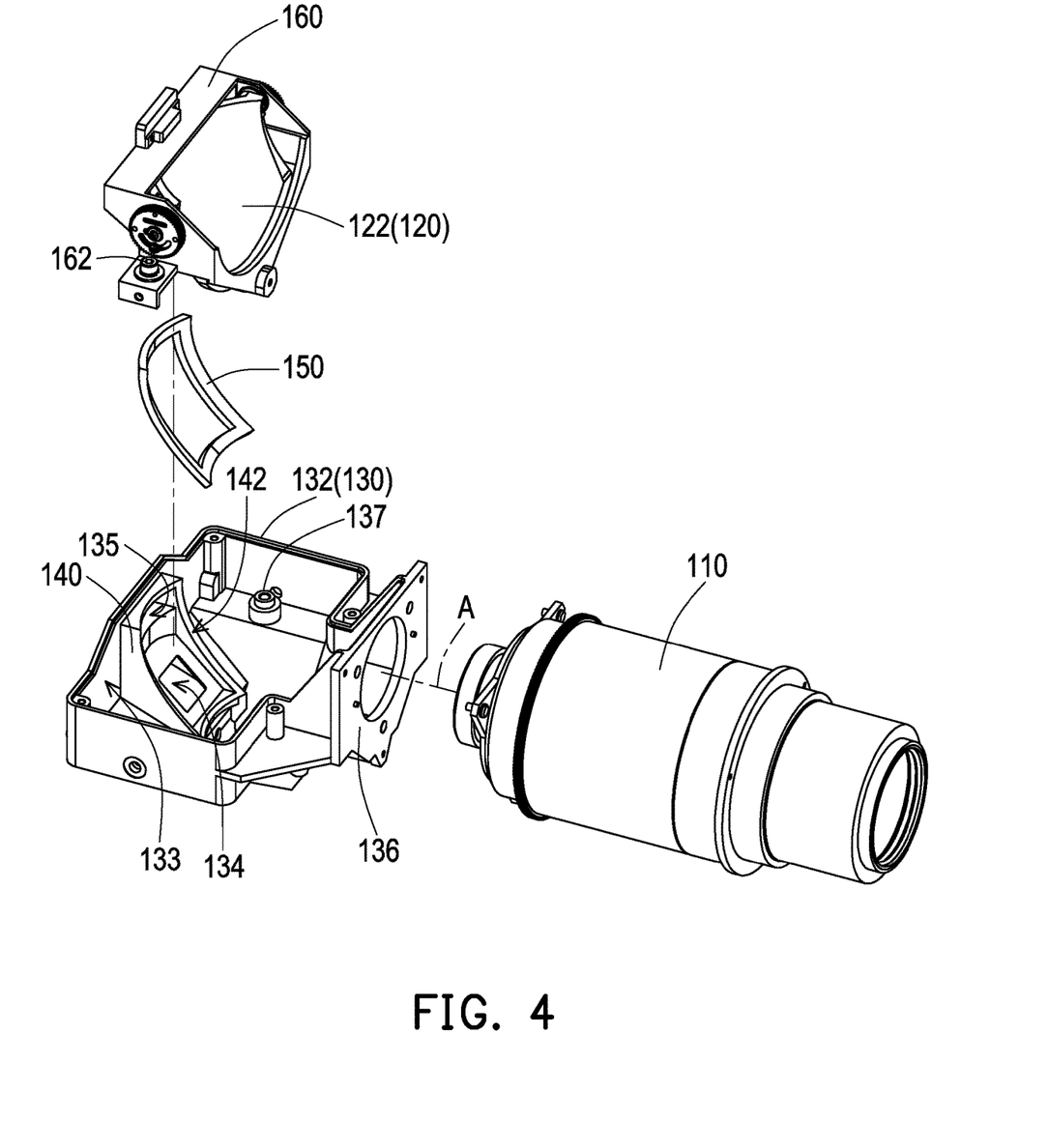
FIG. 4 is a schematic view illustrating FIG. 3 in another view angle.

FIG. 1 is a schematic view illustrating a projection lens module according to an embodiment of the invention. FIG. 2 is a schematic perspective view illustrating an upper housing in the projection lens module depicted in FIG. 1. FIG. 3 is a schematic exploded view illustrating the projection lens module depicted in FIG. 1. FIG. 4 is a schematic view illustrating FIG. 3 in another view angle.

With reference to FIG. 1 to FIG. 4, in the present embodiment, a projection lens module 100 is, for instance, applied to an ultra-short throw (UST) projector, while the way to apply the projection lens 100 should not be construed as a limitation to the invention. The projection lens module 100 includes a lens assembly 110, a reflector 120 (FIG. 4), a housing assembly 130, and a buffer 150 (FIG. 4).

As shown in FIG. 4, the reflector 120 provided in this embodiment is, for instance, a concave mirror, but the type of the reflector 120 is not limited to what is described herein. The reflector 120 is arranged beside the lens assembly 110 and includes a reflecting surface 122 and a back surface 124 (FIG. 3) opposite to each other. The reflecting surface 122 is, for instance, a concave surface of the concave mirror, and the back surface 124 is, for instance, a convex surface of the concave mirror.

The reflecting surface 122 faces the lens assembly 110 to reflect a light beam passing through the lens assembly 110. A transparent lens 138 (FIG. 3) is arranged at the housing assembly 130. The light beam reflected by the reflecting surface 122 leaves the projection lens module 100 through the transparent lens 138.

In addition, in the present embodiment, the reflecting surface 122 of the reflector 120 has a coating film thereon to reflect the light beam coming from the lens assembly 110.

As shown in FIG. 2 and FIG. 3, the housing assembly 130 covers the reflector 120. The housing assembly 130 provided in this embodiment is made of an opaque material to avoid damages to consumers' eyes caused by light leakage when the consumers look at the reflector 120.

The housing assembly 130 includes an inner surface 133, an upper housing 131, a lower housing 132, an air inlet 134, an air outlet 135, and a flow channel frame 140 (FIG. 4). In the present embodiment, the air inlet 134, the air outlet 135, and the flow channel frame 140 are located at the lower housing 132 and face the back surface 124. In other embodiments, the air inlet 134, the air outlet 135, and the flow channel frame 140 may also be partially or completely located at the upper housing 131.

In the present embodiment, the upper housing 131 and the lower housing 132 are precisely processed, and thus air impermeability between the upper housing 131 and the lower housing 132 may be ensured to some extent after assembly. In another embodiment, a dust-proof gasket may also be arranged between the upper housing 131 and the lower housing 132, or an adhesive tape may be attached to the outside to enhance the air impermeability between the upper housing 131 and the lower housing 132.

As shown in FIG. 4, the flow channel frame 140 is arranged on the inner surface 133 of the housing assembly 130 and protrudes toward the back surface 124. In the present embodiment, the flow channel frame 140 and the lower housing 132 are, for instance, integrally formed. In other embodiments, the flow channel frame 140 and the lower housing 132 may also be two separate pieces which are fixed by adhesive bonding, screw connection, and so on.

The flow channel frame 140 protrudes from the inner surface 133 of the lower housing 132 and frames and surrounds peripheries of the air inlet 134 and the air outlet 135. In other words, the air inlet 134 and the air outlet 135 are located corresponding to an area framed by the flow channel frame 140. The flow channel frame 140 is configured to define the range of a flow channel F (shown in FIG. 5). The flow channel frame 140 includes an arc-shaped contact surface 142 contacting the buffer 150. In the present embodiment, a contour of the arc-shaped contact surface 142 has an arc shape and, for instance, corresponds to a contour of a corresponding part on the back surface 124.

A position of the reflector 120 of the projection lens module 100 of the UST projector should be adjusted in response to different lens assemblies 110 during assembly, so that gaps between the back surface 124 of the reflector 120 and the arc-shaped contact surface 142 of the flow channel frame 140 in the different projection lens modules 100 are also different.

In the present embodiment, the buffer 150 is sandwiched between the flow channel frame 140 and the back surface 124. The buffer 150 directly contacts the arc-shaped contact surface 142 of the flow channel frame 140 and the back surface 124. The flexible buffer 150 is, for instance, made of rubber, silicone rubber, a foam material, or another material which may be squeezed and deformed and may be applied for sealing, so as to form an air-tight barrier by the flow channel frame 140 and the back surface 124. Therefore, the back surface 124 of the reflector 120 and the arc-shaped contact surface 142 of the flow channel frame 140 may be completely sealed through the arrangement of the buffer 150.

In addition, the projection lens module 100 further includes a reflector bracket 160 located in the housing assembly 130, and the reflector 120 is fixed to the reflector bracket 160. The lower housing 132 includes a first fixing part 137, the reflector bracket 160 includes a second fixing part 162 corresponding to the first fixing part 137, and the reflector bracket 160 is fixed to the lower housing 132 by the first fixing part 137 and the second fixing part 162. In the present embodiment, the first fixing part 137 and the second fixing part 162 are, for instance, fixed by screw connection, which should however not be construed as a limitation to the invention. The reflector bracket 160 is, for instance, an adjustment wheel that is connected to the reflector 120 and is suitable for rotating the reflector 120 to adjust the position and the angle of the reflector 120.

In the present embodiment, the lower housing 132 further includes a lens barrel fixing base 136, and the lens assembly 110 penetrates and is fixed to the lens barrel fixing base 136 and partially extends into the housing assembly 130. For instance, the lens barrel fixing base 136 is a plate body with a hole, and the lens assembly 110 is adapted to pass through the hole and partially extend into the housing assembly 130 (an optical axis A of the lens assembly 110 passes through the hole, for instance), and the lens assembly 110 and the lens barrel fixing base 136 are fixed by screw connection; that is, the lens assembly 110 and the housing assembly 130 are assembled and fixed through the lens barrel fixing base 136. The space between the lens barrel fixing base 136 and the lens assembly 110 may be air-tight through filling or arrangement of a gasket, so as to prevent dust from entering. In one embodiment, the lens assembly 110, for instance, comprises a connector. The connector is suitable for penetrating the hole and partially extends into the housing assembly 130, and has a sealed function.

Figure 5:
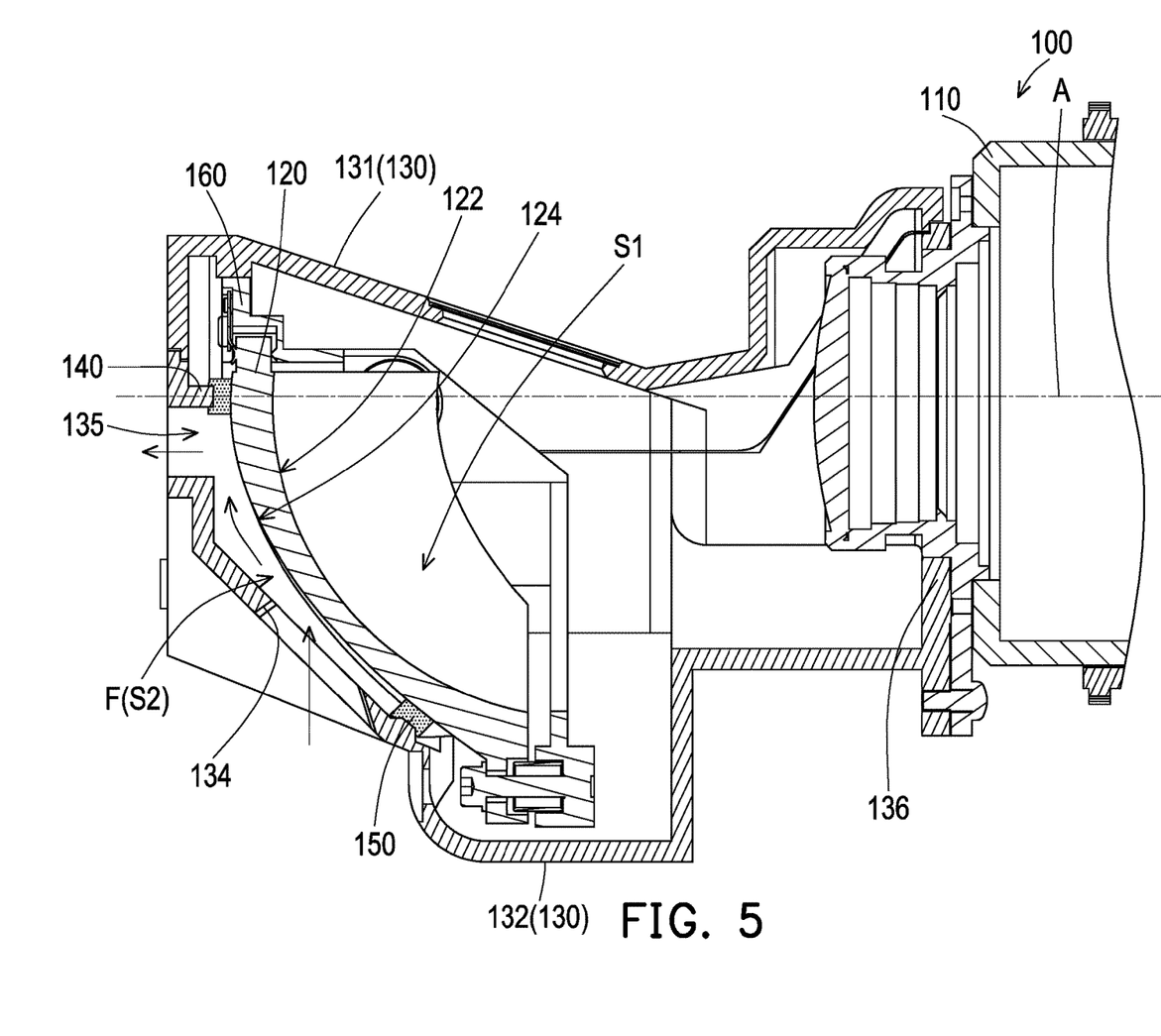
FIG. 5 is a schematic cross-sectional view illustrating the projection lens module depicted in FIG. 1.

FIG. 5 is a schematic cross-sectional view illustrating the projection lens module depicted in FIG. 1. With reference to FIG. 5, enclosed space S1 is formed among the housing assembly 130 (e.g., a portion of the upper housing 131 and the lower housing 132), the flow channel frame 140, the buffer 150, and at least one portion of the back surface 124 and the reflecting surface 122 of the reflector 120. The reflecting surface 122 is located in the enclosed space S1.

Wind guided space S2 is formed between the flow channel frame 140 and the back surface 124 of the reflector 120 (e.g., a portion of the back surface 124). The wind guided space S2 forms the flow channel F, and the flow channel F communicates with the air inlet 134 and the air outlet 135. An air flow flows through the flow channel F beside the back surface 124 of the reflector 120 from the air inlet 134 and leaves from the air outlet 135 to reduce a temperature of the reflector 120. In other embodiments, the wind guided space S2 may also be formed among the housing assembly 130 (e.g., another portion of the lower housing 132), the flow channel frame 140 and a portion of the back surface 124 of the reflector 120.

Figure 6:
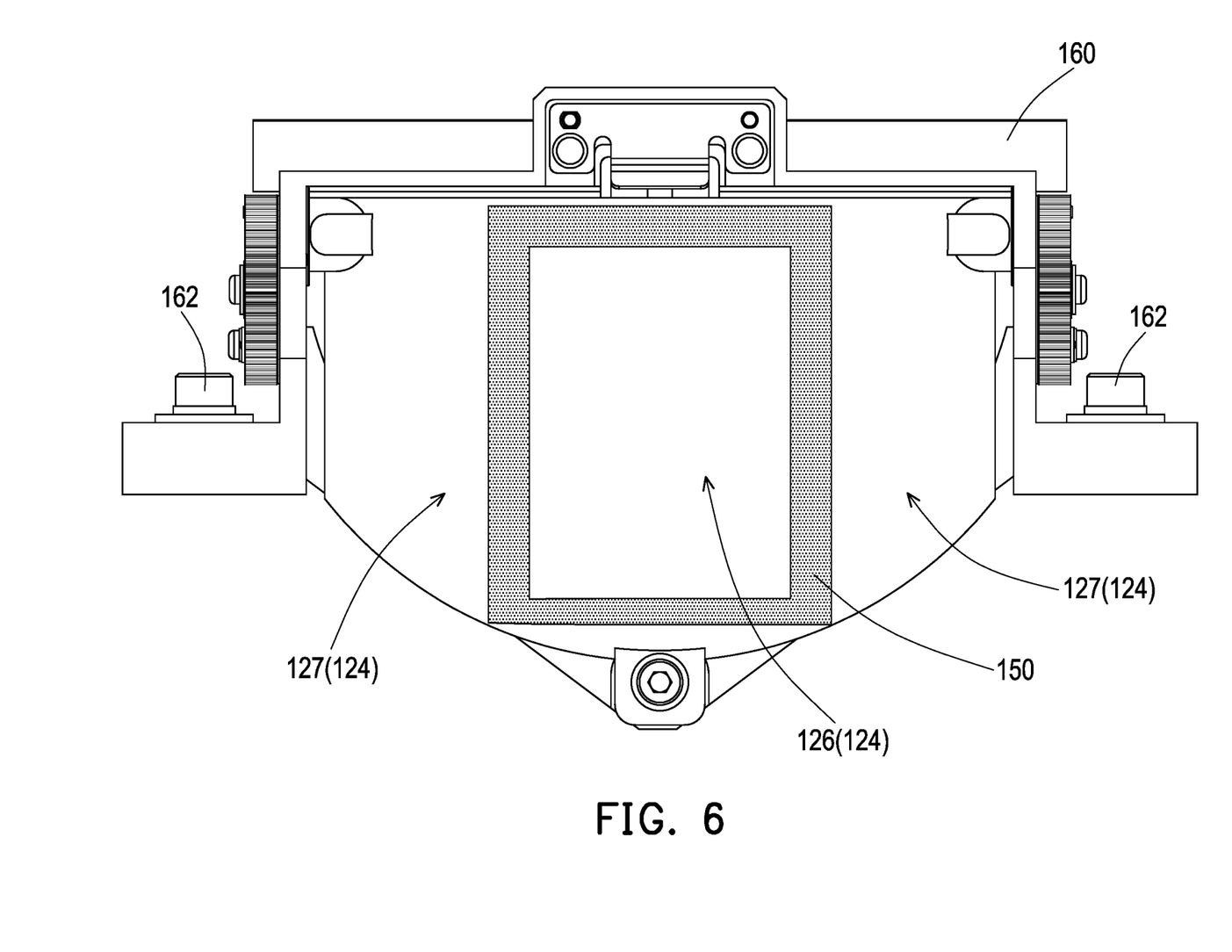
FIG. 6 is a schematic back view illustrating a reflector, a buffer, and a reflector bracket in the projection lens module depicted in FIG. 1.

FIG. 6 is a schematic back view illustrating a reflector, a buffer, and a reflector bracket in the projection lens module depicted in FIG. 1. With reference to FIG. 4 and FIG. 6, to be specific, when the light beam is incident to the reflecting surface 122 of the reflector 120, energy of the light beam raises the temperature of the reflecting surface 122 and the back surface 124 of the reflector 120. Since the light beam does not illuminate the reflector 120 in a uniform manner but is concentrated to a partial region of the reflector 120, the region absorbs more energy. In other words, the temperature on the reflecting surface 122 and the back surface 124 of the reflector 120 is distributed in a uniform manner. The non-uniform temperature distribution on the reflecting surface 122 and the back surface 124 affects the quality of the image frame of the projection lens module 100.

The back surface 124 may divided into a central region 126 and two peripheral regions 127 located on both sides of the central region 126. For instance, the range framed by the buffer 150 is the range of the central region 126. The central region 126, for instance, includes the geometric center of the reflector 120 or a location where the optical axis A of the lens assembly 110 (FIG. 5) passes, and the central region 126 serves as a region of the reflector 120 with a relatively high temperature during the operation of the projection lens module 100.

As shown in FIG. 4, on the back surface 124, a position corresponding to the buffer 150 is a position corresponding to the flow channel frame 140. Therefore, an area surrounded by the arc-shaped contact surface 142 of the flow channel frame 140 is smaller than an area of the back surface 124 of the reflector 120. The flow channel frame 140 surrounds the air inlet 134 and the air outlet 135. Hence, the position of the air inlet 134 also corresponds to the central region 126 of the back surface 124 (FIG. 6). The position design of the flow channel frame 140 and the air inlet 134 allows the air flow to be concentrated to the central region 126 of the back surface 124 (here, the region with the highest temperature in the back surface 124) to improve the heat dissipating efficiency.

In other words, in the projection lens module 100 provided in this embodiment, the position of the air inlet 134 corresponds to the central region 126 of the back surface 124, so as to guide the air flow through the central region 126 of the back surface 124 to better reduce the temperature of the central region 126 and further reduce the temperature difference among different regions on the reflecting surface 122 and the back surface 124. Such a design is conducive to solving the problem of blurred projection images due to the overheating phenomenon. At the same time, the decrease in the temperature of the reflector 120 may lead to an increase in the brightness of the product.

In addition, since the enclosed space 51 is dust-tight space, the light beam travels in the enclosed space 51. The air flow flows in the flow channel F for heat exchange with the reflector 120. The enclosed space 51 and the flow channel F are separated by the buffer 150 without affecting each other. In other words, dust or particles do not fall between the lens assembly 110 and the reflecting surface 122 to ensure that the travelling light beam is not affected by external dust or air in the flow channel F.

To sum up, the housing assembly of the projection lens module provided in one or more embodiments of the invention includes the flow channel frame and the air inlet and the air outlet facing the back surface of the reflector. The flow channel frame is arranged on the inner surface of the housing assembly and protrudes toward the back surface. The air inlet and air outlet are located corresponding to an area framed by the flow channel frame, so that the flow channel is formed between the flow channel frame and at least one portion of the back surface of the reflector and communicates with the air inlet and the air outlet. Hence, the air flow can enter the flow channel from the air inlet, flow beside the back surface of the reflector, and leaves from the air outlet to take away the heat energy of the reflector for effective temperature reduction. Besides, the flow channel frame allows the air flow to be concentrated to a heat generating region of the reflector, which may enhance the heat dissipation efficiency. Additionally, the buffer is sandwiched between the flow channel frame and the back surface of the reflector, and such a design allows other space in the housing assembly to be enclosed and thus isolated from the flow channel. Thereby, the dust mixed into the air flow entering the flow channel may be prevented from affecting the reflection effects of the reflector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens module, comprising:
   a lens assembly;
   a reflector, arranged beside the lens assembly and comprising a reflecting surface and a back surface opposite to each other, wherein the reflecting surface faces the lens assembly to reflect a light beam passing through the lens assembly;
   a housing assembly, covering the reflector and comprising a flow channel frame, an inner surface, and an air inlet and an air outlet facing the back surface, wherein the flow channel frame is disposed on the inner surface of the housing assembly and protrudes toward the back surface; and
   a buffer, sandwiched between the flow channel frame and the back surface, wherein a flow channel is formed between the flow channel frame and the back surface of the reflector, and the flow channel communicates with the air inlet and the air outlet.

2. The projection lens module according to claim 1, wherein the housing assembly comprises an upper housing and a lower housing, and the air inlet and the air outlet are located at the lower housing.

3. The projection lens module according to claim 2, wherein the flow channel frame and the lower housing are integrally formed.

4. The projection lens module according to claim 2, wherein the flow channel frame and the lower housing are fixed by adhesive bonding or screw connection.

5. The projection lens module according to claim 2, wherein the lower housing comprises a lens barrel fixing base, and the lens assembly penetrates the lens barrel fixing base and partially extends into the housing assembly.

6. The projection lens module according to claim 1, wherein the flow channel frame comprises an arc-shaped contact surface contacting the buffer, and an area surrounded by the arc-shaped contact surface is smaller than an area of the back surface of the reflector.

7. The projection lens module according to claim 6, wherein a contour of the arc-shaped contact surface corresponds to a contour of a corresponding part on the back surface.

8. The projection lens module according to claim 1, wherein the air inlet faces a central region of the back surface.

9. The projection lens module according to claim 1, further comprising a reflector bracket located in the housing assembly, wherein the reflector is fixed to the reflector bracket.

10. The projection lens module according to claim 9, wherein the housing assembly comprises a lower housing, the lower housing comprises a first fixing part, the reflector bracket comprises a second fixing part corresponding to the first fixing part, and the reflector bracket is fixed to the lower housing by the first fixing part and the second fixing part.

11. The projection lens module according to claim 1, wherein an enclosed space is formed between the housing assembly, the flow channel frame and the reflector, and the reflecting surface is located in the enclosed space.

* * * * *